Oct. 30, 1934.   E. DOBBELMANN ET AL   1,979,147
APPARATUS FOR CLEANING BEER COILS OR OTHER PIPES
Filed Nov. 25, 1933   2 Sheets-Sheet 1
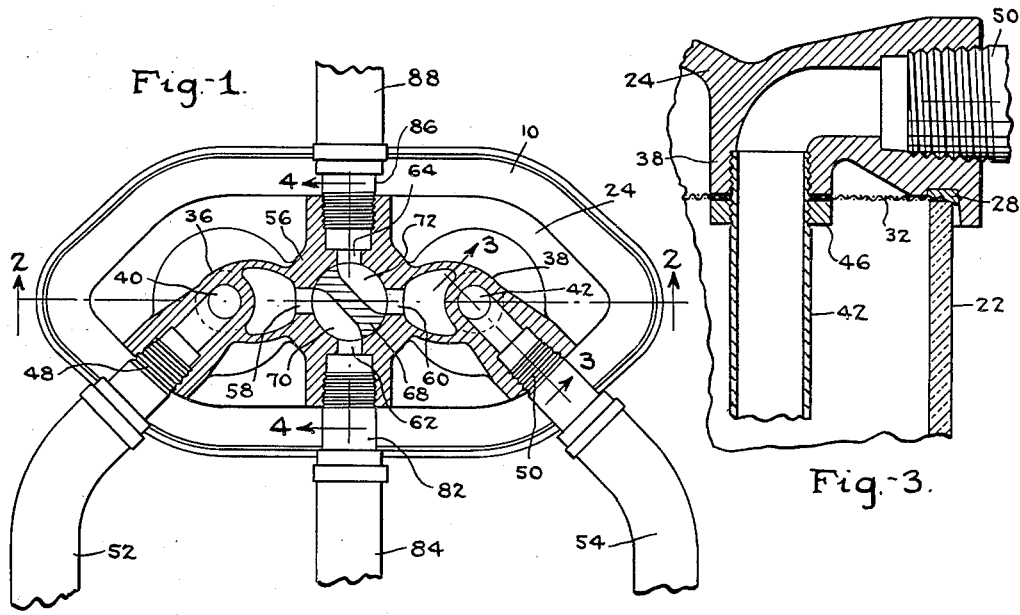
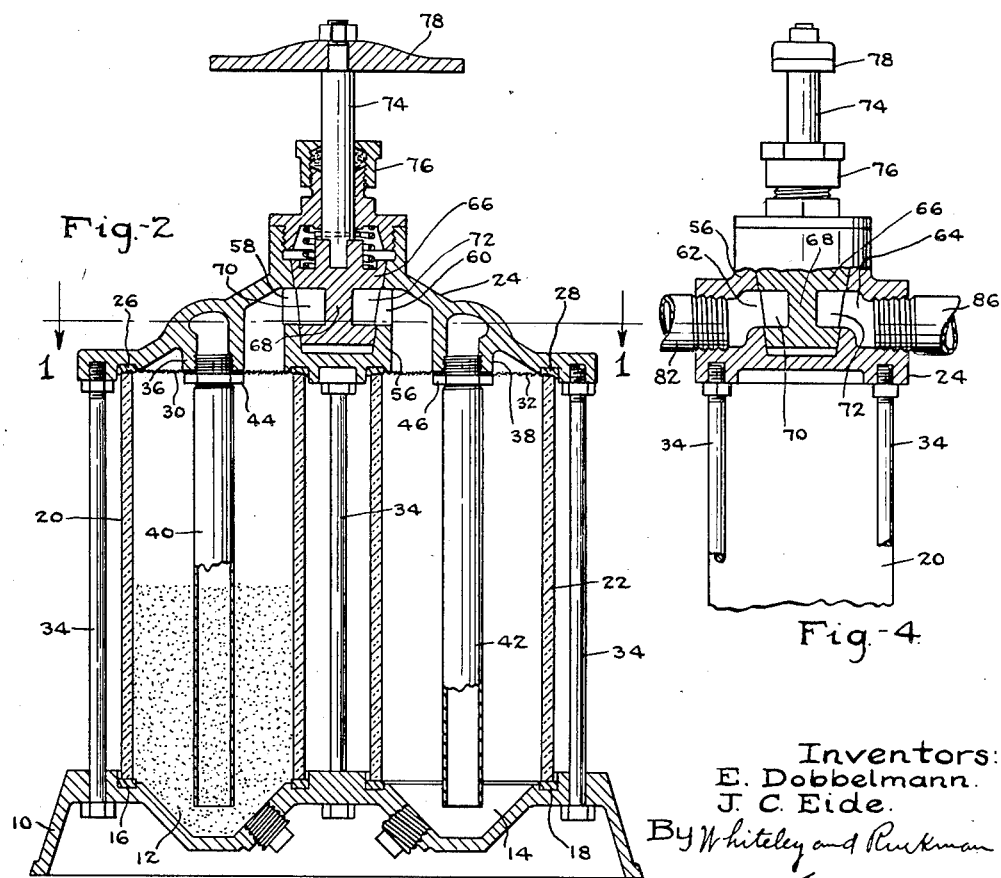
Inventors:
E. Dobbelmann.
J. C. Eide.
By Whiteley and Ruckman
Attorneys.

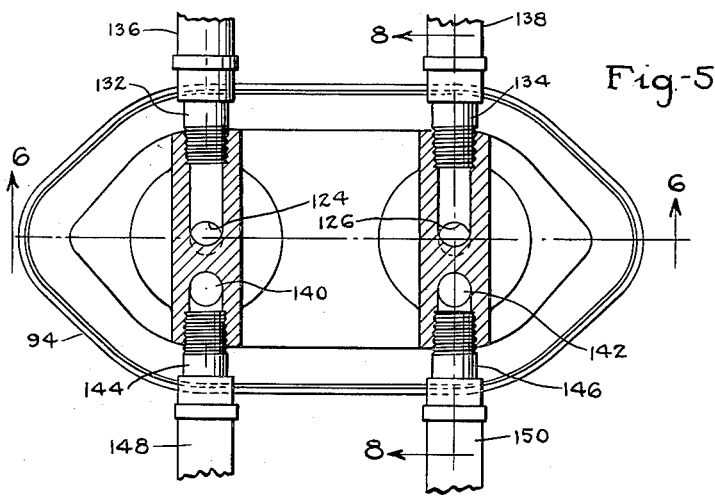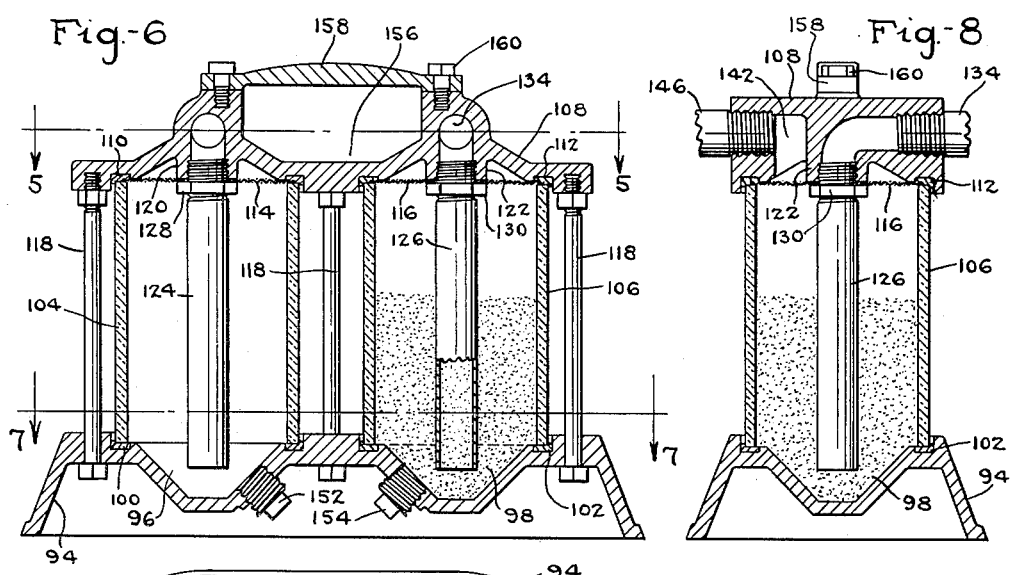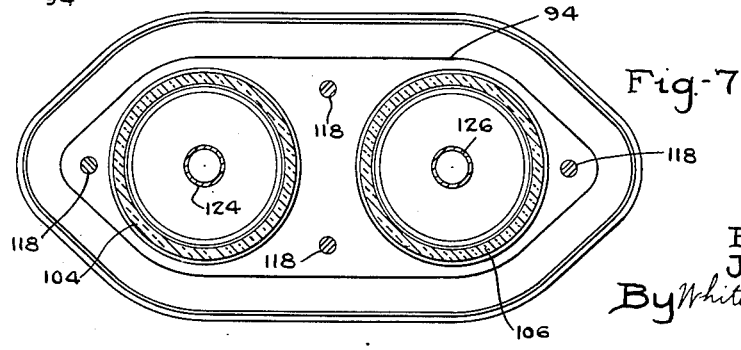

Patented Oct. 30, 1934

1,979,147

UNITED STATES PATENT OFFICE 1,979,147

APPARATUS FOR CLEANING BEER COILS OR OTHER PIPES

Emile Dobbelmann and John C. Eide, Minneapolis, Minn.

Application November 25, 1933, Serial No. 699,730

2 Claims. (Cl. 225—12)

Our invention relates to apparatus for cleaning beer coils or other pipes. While intended particularly for cleaning refrigerating coils used in dispensing beer, it will be understood that the apparatus may be used for cleaning other pipes in which an incrustation has accumulated. Coils through which beer passes gradually accumulate an interior coating of bacterial slime which if not seasonably removed, has a very injurious effect on the quality and taste of the beer. It is difficult to thoroughly remove this slime by the use of chemicals and furthermore, traces of the chemicals are apt to remain and impart an undesirable flavor to the beer. An object of our invention is to provide means for causing a uniformly distributed mixture of water and abrasive material to pass through the coil or pipe and scour the interior surface thereof to remove objectionable accumulations such as those just referred to.

The full objects and advantages of our invention will appear in connection with the following detailed description and the novel features embodied in the invention will be particularly pointed out in the claims appended at the end of the description.

In the accompanying drawings which illustrate two forms in which our invention may be embodied, Fig. 1 is a view in horizontal section on the line 1—1 of Fig. 2. Fig. 2 is a view in vertical section on the line 2—2 of Fig. 1. Fig. 3 is a view on an enlarged scale taken in section on the line 3—3 of Fig. 1. Fig. 4 is a view in vertical section on the line 4—4 of Fig. 1. Fig. 5 is a view of a different form in horizontal section on the line 5—5 of Fig. 6. Fig. 6 is a view in vertical section on the line 6—6 of Fig. 5. Fig. 7 is a view in horizontal section on the line 7—7 of Fig. 6. Fig. 8 is a view in vertical section on the line 8—8 of Fig. 5.

Referring to the construction shown in the drawings and first more particularly to the form shown in Figs. 1-4, the numeral 10 designates a base member which is provided with the two similar depressions 12 and 14. These depressions are surrounded respectively by annular seats in which are placed gaskets 16 and 18 as will be understood from Fig. 2. Resting upon these gaskets respectively are the lower ends of tubular members 20 and 22 preferably of transparent material such as glass. For holding the upper ends of the tubular members 20 and 22, a top member 24 is provided with seats fitted with gaskets 26 and 28. The margins of fine mesh screens 30 and 32 are interposed between these gaskets and the upper ends of the tubular members 20 and 22. The parts just described are held together by screw rods 34 which pass through the base 10 and screw into the top member 24. The top member is provided with hollow bosses 36 and 38 which open downwardly and are fitted with tubes 40 and 42 which extend down respectively through the tubular members 20 and 22 and into the depressions 12 and 14 so that their lower ends are below the lower ends of the tubular members 20 and 22. Nuts 44 and 46 on the upper threaded portions of the tubes 40 and 42 serve to hold the screens 30 and 32 firmly against the lower ends of the bosses 36 and 38 where the screens are provided with openings for passage of the tubes. As will be understood from Figs. 1 and 3, the bosses 36 and 38 are provided with lateral openings which at their outer ends are threaded to receive external threads on nipples, 48 and 50 to which flexible tubes 52 and 54 respectively are attached.

The central portion of the top member 24 is constructed to form a valve casing 56 having two diametrically opposite ports 58 and 60 and two diametrically opposite ports, 62 and 64 having a 90° relation to the first ports. The interior of the valve casing is of conical shape to provide a seat for a rotary conical valve 66 which on opposite sides thereof is cut away thus leaving a reduced portion 68 so that two opposite passages 70 and 72 are provided in the valve. A stem 74 extends up from the valve through a stuffing box 76 and at its upper end is provided with a handle 78 by means of which the valve may be turned. A spring 80 placed between the valve and the lower portion of the stuffing box serves to keep the valve firmly seated. The port 62 communicates with a nipple 82 to which is attached a flexible tube 84 adapted to be connected with any suitable source of water supply. The port 64 communicates with a nipple 86 to which is attached a flexible tube 88 constituting a waste pipe which may be arranged to discharge into the sewer. The depressions 12 and 14 are provided with screw plugs 90 and 92 whereby access may be had to the interior of the receptacles 20 and 22.

The operation and advantages of the form of invention shown in Figs. 1-4 will be readily understood from the foregoing description. The tube 52 is connected to one end of the coil or pipe which is to be cleaned while the tube 54 is connected to the other end thereof. In the case of a coil, it will be understood that a draw off faucet may be at one end thereof and will also be cleaned. In order to use the apparatus, a quantity of abrasive material such as sharp sand is placed in one of the receptacles 20 and 22. In Fig. 2, this abrasive material is shown in the receptacle 20. The valve 66 should now be in the position shown in Fig. 1. Upon turning on the supply of water through the tube 84, the water will go through the port 62, the passage 70, the port 58, down through the sand in the receptacle 20 and up through the tube 40 carrying some of the sand with it. The commingled sand and water rising in the tube 40 passes out through the tube 52, through the coil or pipe which is to be cleaned, through the tube 54 and down the tube 42 into the receptacle 22 where the sand is retained by the screen 32 which is of sufficiently fine mesh to prevent passage thereof. However the water containing the slime or sludge which has been removed passes through the screen, through the port 60, the passage 72, the port 64 and out through the discharge tube 88. Due to the fact that the water passes downwardly in the receptacle 20, it will seep through the sand and gradually carry the sand along with it up the tube 40 with uniform distribution and commingling of the sand. When all of the sand has been transferred from the receptacle 20 to the receptacle 22, the valve 66 is turned through 90°. It is obvious that the sand will be conveyed back to the receptacle 20 through the coil. A few reversals of this character are sufficient to thoroughly scour the inner wall of the coil or pipe and remove all accumulation of slime or sludge with retention of the abradant in one or the other of the receptacles 20 and 22 according to the direction of flow at the time when the operation is completed.

Referring now to the form of invention shown in Figs. 5–8, it will be observed that there is a base member 94 which is like the base member previously referred to and which contains 2 similar depressions 96 and 98. These depressions are surrounded respectively by annular seats in which are placed gaskets 100 and 102. Resting upon these gaskets respectively are the lower ends of tubular members 104 and 106 preferably of transparent material such as glass. For holding the upper ends of the tubular members 104 and 106, a top member 108 is provided with seats fitted with gaskets 110 and 112. The margins of fine mesh screens 114 and 116 are interposed between these gaskets and the upper ends of the tubular members 104 and 106. The parts just described are held together by screw rods 118 which pass through the base 94 and screw into the top member 108. The top member is provided with hollow bosses 120 and 122 which open downwardly and are fitted with tubes 124 and 126 which extend downwardly through the tubular members 104 and 106 and into the depressions 96 and 98 so that their lower ends are below the lower ends of the tubular members. Nuts 128 and 130 on the upper threaded portions of the tubes 124 and 126 serve to hold the screens 114 and 116 against the lower ends of the bosses 120 and 122 where the screens are provided with openings for passage of the tubes. As will be understood from Figs. 5 and 8, the bosses 120 and 122 are provided with lateral openings which at their outer ends are threaded to receive exterior threads on nipples 132 and 134 to which flexible tubes 136 and 138 respectively are attached. The construction as thus far described is similar to the construction embodied in the form shown in Figs. 1–4. In the latter form however, the top member 108 is not provided with a valve, but is provided with two passageways 140 and 142 which are fitted with outwardly extending nipples 144 and 146 respectively to which flexible tubes 148 and 150 are attached. The inner portions of the passageways just referred to turn downwardly so as to open just above the screens 114 and 116 and hence be in communication respectively with the receptacles 104 and 106 through the screens. Access to the receptacles 104 and 106 may be had by means of screw plugs 152 and 154 with which the depressions 96 and 98 are provided. The top member 108 is hollowed out at its central portion as indicated at 156 in Fig. 6, and this hollowed out portion is provided with a handle 158 secured by screw bolts 160.

The operation and advantages of the second form of the invention will now be readily understood. The tube 136 is connected to one end of the coil or pipe which is to be cleaned while the tube 138 is connected to the other end thereof. In order to use the apparatus, a quantity of abrasive material such as sharp sand is placed in one of the receptacles 104 and 106. In Figs. 6 and 8, this abrasive material is shown in the receptacle 106. The tube 150 is connected to a source of water supply, so that the water will go through the passageway 142, down through the sand in the receptacle 106 and up through the tube 126 carrying some of the sand with it. The commingled sand and water rising in the tube 126 passes out through the tube 138, through the coil or pipe which is to be cleaned, through the tube 136 and down the tube 124 into the receptacle 104 where the sand is retained by the screen 114. The water containing the slime or sludge which has been removed passes through the screen, through the passageway 140, and out through the tube 148 which now serves as a waste pipe and may discharge into the sewer. When all of the sand has been transferred from the receptacle 106 to the receptacle 104, the tube 150 is disconnected from the water supply and the tube 148 is connected with the water supply. It is obvious that this will reverse the operation so that the sand will be conveyed back to the receptacle 106 through the coil, the tube 150 now serving as a waste pipe. A few reversals of this character are sufficient to thoroughly scour the inner wall of the coil or pipe and remove all accumulations of slime or sludge with retention of the sand in one or the other of the receptacles 104 and 106, according to the direction of flow at the time when the operation is completed. All traces of sand will be removed from the coil by running clear water therethrough for a short time.

By running water down through the abrasive material in the receptacles and then up through tubes such as the tubes 40 and 42, the speed of the abrasive material is increased and hence the amount of scouring in the coil is increased. Furthermore the abrasive material is trapped in the bottom of the receptacle and when the pressure of water is applied, the abrasive material is carried gradually and uniformly through the coil and produces a uniform scouring action on all portions of the inner wall of the coil. In practice, we have found that sharp sand produces a better scouring action and results in a better polishing on the inner wall of the coil than coarse abrasive material.

We claim:

1. Apparatus for cleaning beer coils or other pipes, comprising a base member having depressions therein, a top member, two receptacle members adapted to hold abrasive material interposed between said base and top members with said depressions constituting bottoms for said receptacle members, screens covering the tops of the receptacles thus produced, a pair of passageways in said top members communicating at their inner ends respectively with said receptacles through their associated screens, tubes connected with the outer ends of said passageways, said tubes being adapted for connection with a water supply and for use as a waste pipe, a second pair of passageways in said top member, tubes extending from the inner ends of said passageways down into said depressions respectively, and tubes connected to the outer ends of said passageways, the free ends of said last mentioned tubes being adapted for attachment to the respective ends of the coil or pipe to be cleaned.

2. Apparatus for cleaning beer coils or other pipes, comprising a base member having depressions therein, a top member, two receptacle members adapted to hold abrasive material interposed between said base and top members with said depressions constituting bottoms for said receptacle members, screens covering the tops of the receptacles thus produced, a pair of passageways in said top members communicating at their inner ends respectively with said receptacles through their associated screens, tubes connected with the outer ends of said passageways, said tubes being adapted for connection with a water supply and for use as a waste pipe, a second pair of passageways in said top member, tubes extending from the inner ends of said passageways down into said depressions respectively, tubes connected to the outer ends of said passageways, the free ends of said last mentioned tubes being adapted for attachment to the respective ends of the coil or pipe to be cleaned, and a valve mounted in said top member for reversing the direction of flow through said receptacles.

EMILE DOBBELMANN.
JOHN C. EIDE.